(12) United States Patent
Domine

(10) Patent No.: US 7,112,624 B2
(45) Date of Patent: Sep. 26, 2006

(54) ETHYLENE ALKYL ACRYLATE COPOLYMERS WITH IMPROVED HEAT RESISTANCE

(75) Inventor: Joseph D. Domine, Humble, TX (US)

(73) Assignee: ExxonMobil Chemical Patents, Inc., Houston, TX (US)

( * ) Notice: Subject to any disclaimer, the term of this patent is extended or adjusted under 35 U.S.C. 154(b) by 206 days.

(21) Appl. No.: 10/466,450

(22) PCT Filed: Jan. 18, 2002

(86) PCT No.: PCT/US02/01471

§ 371 (c)(1),
(2), (4) Date: Nov. 13, 2003

(87) PCT Pub. No.: WO02/057354

PCT Pub. Date: Jul. 25, 2002

(65) Prior Publication Data

US 2004/0072970 A1      Apr. 15, 2004

Related U.S. Application Data

(60) Provisional application No. 60/263,000, filed on Jan. 19, 2001, provisional application No. 60/263,002, filed on Jan. 19, 2001.

(51) Int. Cl.
*C08K 5/01* (2006.01)
(52) U.S. Cl. .................. 524/476; 524/481; 524/483; 524/487; 524/489; 524/490; 526/64; 526/319; 526/320
(58) Field of Classification Search ............. 524/476, 524/481, 483, 487, 489, 490; 526/319, 320, 526/64
See application file for complete search history.

(56) References Cited

U.S. PATENT DOCUMENTS

| | | | | |
|---|---|---|---|---|
| 2,953,551 | A | | 9/1960 | White ................. 260/86.7 |
| 3,350,372 | A | | 10/1967 | Anspon et al. .......... 260/86.7 |
| 3,884,786 | A | * | 5/1975 | Domine et al. ............ 524/487 |
| 4,135,044 | A | | 1/1979 | Beals |
| 4,404,299 | A | * | 9/1983 | Decroix ................ 524/77 |
| 4,434,261 | A | * | 2/1984 | Brugel et al. ............ 524/109 |
| 4,816,306 | A | * | 3/1989 | Brady et al. ............ 428/36.92 |
| 4,874,804 | A | * | 10/1989 | Brady et al. ............. 524/100 |
| 5,095,046 | A | * | 3/1992 | Tse ........................ 523/206 |
| 5,141,809 | A | * | 8/1992 | Arvedson et al. ......... 428/349 |
| 5,234,986 | A | | 8/1993 | McBride |
| 5,401,791 | A | * | 3/1995 | Milks ................... 524/270 |
| 5,500,472 | A | * | 3/1996 | Liedermooy et al. ....... 524/272 |
| 5,543,477 | A | | 8/1996 | Latiolais et al. ........... 526/65 |
| 5,604,268 | A | * | 2/1997 | Randen et al. ............ 523/164 |
| 5,631,325 | A | | 5/1997 | Latiolais et al. ........... 525/227 |
| 6,297,309 | B1 | * | 10/2001 | Bauduin et al. ........... 524/476 |

FOREIGN PATENT DOCUMENTS

| | | |
|---|---|---|
| DE | 3217973 | 11/1983 |
| DE | 3404744 | 8/1985 |
| EP | 0 245 773 | 11/1987 |
| EP | 0 575 873 | 12/1993 |
| JP | 61171981 | * 8/1986 |
| WO | WO 97/34939 | 9/1997 |
| WO | WO 00/58093 | 10/2000 |

OTHER PUBLICATIONS

John Wiley, et al., "Encyclopedia of Polymer Science and Engineering," Ethylene Polymers, John Wiley and Sons, vol. 6, pp. 401-403, 1986.

Kirck Othmer, et al., "Encyclopedia of Chemical Technology, Fourth Edition," Olefins Polymers (Polyethylene), John Wiley and Sons, vol. 17, pp. 718-719, 1986.

* cited by examiner

*Primary Examiner*—Bernard Lipman
(74) *Attorney, Agent, or Firm*—Andrew B. Griffis; Maria C. Walsh

(57) ABSTRACT

The invention provides a copolymer of ethylene and at least 5 mol % of comonomer units derived from an alkyl acrylate or alkyl methacrylate, wherein the copolymer has a melt index of from 1 to 10,000 g/10 min, and a maximum peak melting temperature of at least 100° C. The alkyl group of the alkyl acrylate or alkyl methacrylate can be a linear or branched $C_1$ to $C_{12}$ group, particularly n-butyl. The copolymer shows increased heat resistance as characterized by a temperature required to melt 50% of the copolymer of at least 80° C., a temperature required to melt 80% of the copolymer of at least 100° C., a temperature required to melt 100% of the copolymer of at least 110° C. The invention further provides a process for copolymerizing ethylene and an alkyl acrylate or alkyl methacrylate comonomer.

54 Claims, 4 Drawing Sheets

ETHYLENE ALKYL ACRYLATE COPOLYMERS WITH IMPROVED HEAT RESISTANCE

CROSS REFERENCE TO RELATED APPLICATIONS

This application is a National Stage Application of International Application No. PCT/US02/01471, filed Jan. 18, 2002, which claims the benefit of Provisional Application No. 60/263,000, filed Jan. 19, 2001 and Provisional Application No. 60/263,002, filed Jan. 19, 2001.

1. FIELD OF THE INVENTION

The present invention is directed to novel ethylene alkyl acrylate and ethylene alkyl methacrylate copolymers. In particular, the invention provides copolymers of ethylene and alkyl acrylates or alkyl methacrylates having improved heat resistance, such as higher peak melting temperatures, and processes for producing such copolymers. These novel copolymers are particularly suitable for use as hot melt adhesives, or as components of hot melt adhesive formulations.

2. BACKGROUND

Ethylene is copolymerized with comonomers such as alkyl acrylate or alkyl methacrylate esters or vinyl esters, to create polymers with a different set of properties and attributes not obtainable from homopolymers themselves. Some attributes like adhesion and low temperature toughness, are significantly improved as the content of comonomer(s) is increased. However, increasing comonomer content invariably leads to lower peak melting temperatures, sometimes significantly lower peak melting temperatures, especially in copolymers containing more than about 5 mol % comonomer. As an example, commercially available ethylene vinyl acetate (EVA) and ethylene methyl acrylate (EMA) grades show a significant decrease in peak melting temperature as comonomer content is increased, as shown in FIG. 1 (prior art). These lower peak melting temperatures indicate smaller crystallite sizes that result from shorter runs of uninterrupted, repeating ethylene units in the polymer's backbone. Thus, it is difficult to achieve high melting points with even moderate amounts of comonomer.

Peak melting points can also be significantly reduced by increasing melt index. Data for commercially available, nominally 28 weight % vinyl acetate (VA) copolymers shows a decrease from about 73° C. at 2.3 g/10 min melt index to 63° C. at 420 g/10 min melt index, as shown in FIG. 2 (prior art). These observed trends indicate that using conventional technology, high MI and high comonomer content copolymers will have very low melting points. In certain applications, however, such as hot melt adhesives and some film or molded articles, where heat resistance and strength are particularly important, it would be advantageous to have a copolymer having a combination of high melt index, relatively high comonomer content, and higher melting point.

The use of continuous, back-mixed autoclaves to produce homogeneous ethylene acrylate copolymers is disclosed in U.S. Pat. No. 3,350,372. Copolymer resins produced using autoclave technology are commercially available, and these resins are consistent with the expected trend. For example, as discussed more fully in the Examples herein, at 32.5 weight percent n-butyl acrylate (9.5 mol %), the peak melting temperature of a 330 g/10 min melt index ethylene n-butyl acrylate copolymer available as Enable™ EN-33330 from ExxonMobil Chemical, is poorly defined, with a value about 58.7° C. A lower viscosity grade, with an estimated melt index of about 900 g/10 min and available as Enable™ EN-33900 from ExxonMobil Chemical, has an even lower peak melting temperature of 58.1° C. (see Table 1).

Manufacturers have recognized that the lower melting points of commercially available copolymers are an undesirable limitation, and have attempted to develop technology to increase melting points of ethylene acrylate copolymers (EMA and EnBA) produced in continuous, high pressure autoclaves (see, e.g., U.S. Pat. Nos. 5,543,477 and 5,631,325). These technologies have led to copolymers with peak melting temperatures which are reportedly about 7 to 10° C. higher than other conventionally polymerized copolymers produced in autoclaves.

The first commercial, continuous process developed to produce ethylene alkyl acrylate and alkyl methacrylate copolymers was a tubular reactor process developed by Union Carbide (see U.S. Pat. No. 2,953,551). Tubular reactors are known to be capable of producing ethylene alkyl acrylate and alkyl methacrylate ester copolymers having higher melting temperatures than the same copolymers polymerized in a high pressure autoclave. Commercially available ethylene ethyl acrylate copolymers, produced and sold by Union Carbide since the early 1960's, have relatively high peak melting temperatures compared to autoclave polymerized ethylene methyl acrylate copolymers at the same mole percent comonomer. However, the melting points of copolymers obtainable from these technologies are still undesirably low for some applications.

For further background information, see, for example, WO 00/58093; WO 97/34939; U.S. Pat. No. 5,543,477; DE 3217973; DE 3404744; EP 245773 and EP 575873.

3. SUMMARY

It has been surprisingly found that ethylene alkyl acrylate or alkyl methacrylate copolymers made in a tubular reactor can show significantly higher peak melt temperatures than similar copolymers made in an autoclave reactor or in previously known tubular processes, while allowing a relatively high level of comonomer incorporation. Thus, copolymers of the present invention have peak melting temperatures which exceed substantially those obtained from conventional autoclave polymerization. Even at a higher concentration of n-butyl acrylate comonomer, which should lead to lower peak melting temperatures, the products of the present invention have higher peak melting temperatures than the improved products disclosed in U.S. Pat. Nos. 5,543,477 and 5,631,325, and exceed by more than 8° C. the upper melt-point temperature limit calculated from the equation given in U.S. Pat. No. 5,631,325.

In accordance with the present invention, it has been surprisingly found that ethylene alkyl acrylate or alkyl methacrylate ester copolymers, characterized by high peak melting temperatures, a high level of comonomer and optionally a high melt index, can be produced in a high pressure tubular reactor which uses multiple injection points of free radical initiator. Peak melting temperatures for the copolymers of the present invention are at least 5° C. to more than 50° C. higher than the peak melting temperatures of similar copolymers made using conventional high pressure autoclave process technology, and at least 5° C. to as much as 25° C. higher than similar copolymers made using conventional high pressure tubular reactors which inject initiator at only one point.

In one embodiment, the present invention provides a copolymer of ethylene and at least 5 mol % of comonomer units derived from an alkyl acrylate or alkyl methacrylate, wherein the copolymer has a melt index of from 1 to 10,000 g/10 min, and a maximum peak melting temperature as defined herein of at least 100° C. The alkyl group of the alkyl acrylate or alkyl methacrylate can be a linear or branched $C_1$ to $C_{12}$ group, such as methyl, ethyl, butyl, hexyl and octyl, particularly n-butyl. Additional comonomers, such as acrylic acid, methacrylic acid, partial esters of maleic acid, and carbon monoxide can also be included. The copolymer shows increased heat resistance as characterized by a temperature required to melt 50% of the copolymer of at least 80° C., a temperature required to melt 80% of the copolymer of at least 100° C., a temperature required to melt 100% of the copolymer of at least 110° C.

In another embodiment, the present invention provides a copolymer of ethylene and at least 5 mol % comonomer, the comonomer including a first comonomer component and a second comonomer component. The first comonomer component includes alkyl acrylates, alkyl methacrylates, or mixtures thereof. The second comonomer component includes monomers with a reactivity ratio $r_2$ of 2 or less or of 1.5 or less or of 1.2 or less or of about 1, relative to ethylene. Examples of such monomers include vinyl esters, such as vinyl acetate, vinyl formate or vinyl propionate. The copolymer has a melt index of from 1 to 10,000 g/10 min, and a maximum peak melting temperature as defined herein of at least 80° C. The alkyl group of the alkyl acrylate or alkyl methacrylate can be a linear or branched $C_1$ to $C_{12}$ group, such as methyl, ethyl, butyl, hexyl and octyl, particularly n-butyl. Additional comonomers, such as acrylic acid, methacrylic acid, partial esters of maleic acid, and carbon monoxide can also be included. The copolymer shows increased heat resistance as characterized by a temperature required to melt 50% of the copolymer of at least 40° C., a temperature required to melt 80% of the copolymer of at least 70° C., and a temperature required to melt 100% of the copolymer of at least 80° C.

In another embodiment, the present invention provides a process for copolymerizing ethylene and an alkyl acrylate or alkyl methacrylate comonomer, the process including the steps of feeding a mixture of ethylene and at least one alkyl acrylate or alkyl methacrylate into a high pressure tubular reactor under polymerization conditions and in the presence of one or more free radical initiators to form an ethylene alkyl acrylate or alkyl methacrylate copolymer, wherein the free radical initiator is injected into the tubular reactor in at least two reaction zones, preferably, at least three reaction zones, along the length of the tubular reactor. In contrast, monomer and comonomer are provided to the tubular reactor in only a single reaction zone. Surprisingly, the process produces copolymers as described above having improved temperature properties and higher comonomer content.

In another embodiment, the present invention provides an ethylene alkyl acrylate or alkyl methacrylate copolymer produced by the inventive process.

4. BRIEF DESCRIPTION OF THE DRAWINGS

5. DETAILED DESCRIPTION

Figure 1:
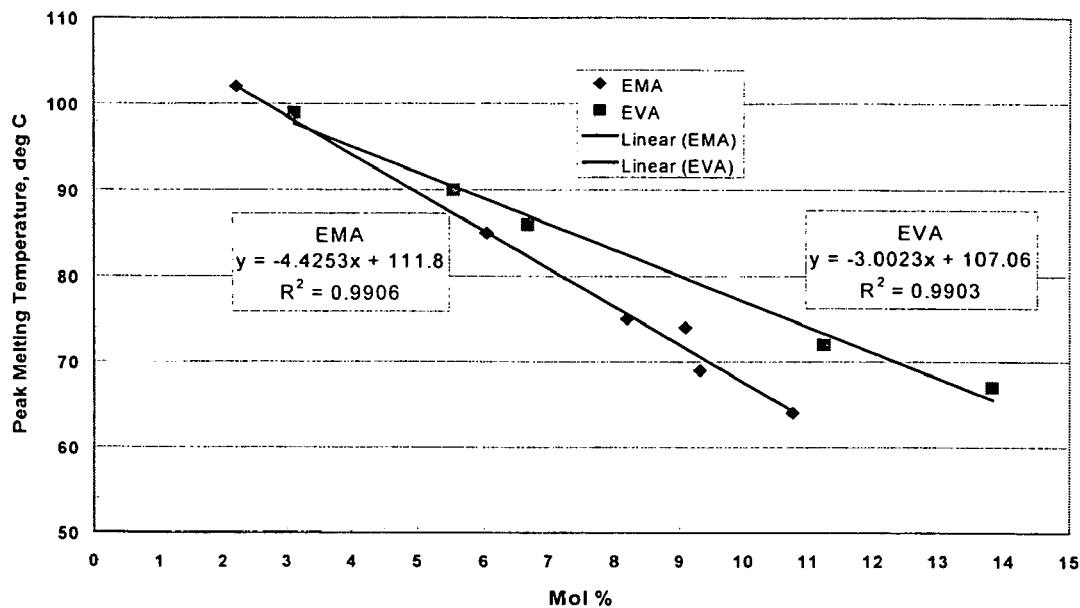
FIG. 1 (prior art) shows the peak melting temperature obtained by differential scanning calorimetry (DSC) for commercially available ethylene vinyl acetate (EVA) and ethylene methyl acrylate (EMA) copolymers, as a function of the comonomer content, using DSC Method 1 as defined herein.
Figure 2:
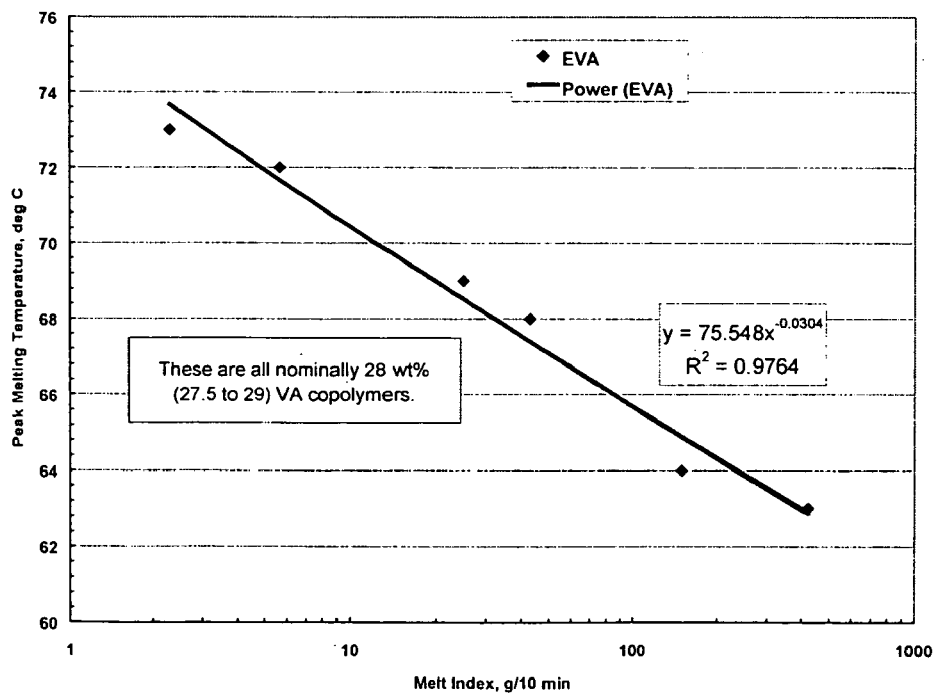
FIG. 2 (prior art) shows the peak melting temperature obtained by differential scanning calorimetry (DSC) for commercially available ethylene vinyl acetate (EVA) copolymers, as a function of the copolymer melt index, using DSC Method 1 as defined herein.

The copolymers of the present invention are copolymers of ethylene and at least one comonomer, wherein the comonomer is an alkyl acrylate or alkyl methacrylate ester. Suitable comonomers include the acrylic acid and methacrylic acid esters of C1 to C12 linear or branched alcohols, preferably acrylic acid and methacrylic acid esters of C1 to C8 linear or branched alcohols. Examples of preferred alkyl acrylate or alkyl methacrylate esters suitable for use as comonomers include methyl acrylate, ethyl acrylate, n-butyl acrylate, iso-butyl acrylate, t-butyl acrylate, n-hexyl acrylate, 2-ethylbutyl acrylate, and 2-ethylhexyl acrylate, as well as the acrylic acid esters of neo-isomers of C5 to C12 alcohols. A particularly preferred comonomer is n-butyl acrylate.

The copolymer can contain at least 5 mol %, preferably from 5 mol % to 20 mol %, 5 mol % to 15 mol %, 6 mol % to 14 mol %, or 7 mol % to 12 mol % comonomer derived units. In one embodiment, the copolymer contains a lower limit of at least 5 mol % or at least 6 mol % or at least 7 mol % comonomer-derived units, and an upper limit of 20 mol % or 14 mol % or 12 mol % comonomer derived units, with ranges from any lower limit to any upper limit being contemplated.

The alkyl acrylate or methacrylate ester monomers can be used alone or in mixtures. Monomers other than ethylene and the alkyl acrylate or alkyl methacrylate esters can optionally be included. These additional monomers include vinyl esters, such as vinyl acetate, and monomers such as acrylic acid, methacrylic acid, or partial esters of maleic acid, and carbon monoxide. Thus, as used herein the term "copolymer" includes polymers made from two, three or more comonomers.

In some embodiments, the copolymer includes ethylene; an alkyl acrylate or alkyl methacrylate, or mixtures thereof; and a comonomer having a reactivity ratio $r_2$ relative to ethylene of 2 or less, or 1.5 or less, or 1.2 or less, or about 1. Exemplary comonomers having such a reactivity ratio include vinyl esters, such as vinyl acetate, vinyl formate, and vinyl propionate. Reactivity ratios $r_2$ are well known in the art, and are described, for example, in *Encyclopedia of Polymer Science and Engineering*, Vol. 6, p.401–403 (1986) (John Wiley, New York); and *Encyclopedia of Chemical Technology*, 4th Ed., Vol. 17, p. 718–719 (1996) (John Wiley, New York).

The ethylene alkyl acrylate or alkyl methacrylate copolymers of the invention can be produced in a high pressure tubular reactor. High pressure tubular reactors for producing ethylene alkyl acrylate or alkyl methacrylate ester copolymers are well known; see, e.g., U.S. Pat. No. 2,953,551, the disclosure of which is incorporated by reference herein for purposes of U.S. patent practice. The present invention is not limited to any specific tubular reactor design, operating pressure or temperature variables, or initiator system, provided that the tubular reactor is capable of injection of initiator into the reaction stream at at least two, preferably at least three, and more preferably at least four locations along the reaction tube.

As used herein, the term "tubular ethylene alkyl acrylate or alkyl methacrylate copolymer" means a copolymer produced in such a multi-initiator-injection, high pressure tubular reactor.

The tubular reactor may be an elongated jacketed tube or pipe, usually in sections or blocks, of suitable strength and diameter. A typical tubular reactor can have a length to diameter ratio of from about 1000 to 1 to about 60,000 to 1. The tubular reactor is typically operated at pressures from about 1000 to 3500 bar, although pressures higher than 3500 bar can be used if desired.

The temperature maintained in the reactor is variable, and is primarily controlled by and dependent on the specific initiator system employed. Temperatures are usually within the range of about 100° C. to 350° C., and can vary in the different reaction zones.

An example of a high pressure tubular reactor suitable for use in producing the ethylene alkyl acrylate or alkyl methacrylate copolymers of the invention is shown in U.S. Pat. No. 4,135,044, the disclosure of which is incorporated herein by reference for purposes of U.S. patent practice. If the reactor shown in U.S. Pat. No. 4,135,044 is used, it is preferred that the reactor be operated without the use of cold side-streams.

The polymerization reaction is carried out in the presence of free radical initiators. Such initiators are well known in the art. Specific non-limiting examples of such free radical initiators include oxygen; peroxide compounds such as hydrogen peroxide, decanoyl peroxide, t-butyl peroxy neo-decanoate, t-butyl peroxy pivalate, 3,5,5-trimethyl hexanoyl peroxide, diethyl peroxide, t-butyl peroxy-2-ethyl hexanoate, t-butyl peroxy isobutyrate, benzoyl peroxide, t-butyl peroxy acetate, t-butyl peroxy benzoate, di-t-butyl peroxide, t-amyl peroxy neodecanoate, t-amyl peroxy pivalate, t-amyl peroxy-2-ethyl hexanoate and 1,1,3,3-tetramethyl butyl hydroperoxide; alkali metal persulfates, perborates and percarbonates; and azo compounds such as azo bis isobutyronitrite. Preferred initiators are organic peroxides. Mixtures of such initiators can also be used, and different initiators and/or different initiator mixtures can be used in the different initiator injections. The initiator can be added to the reaction stream in any suitable manner, such as neat, dissolved in a suitable solvent, and/or mixed with the monomer or comonomer feed stream.

As noted above, an initiator is injected into the reaction stream at at least two locations, preferably at least three locations, and more preferably at least four locations. In a preferred embodiment, monomers and comonomers are introduced into the tubular reactor at a single location, so that injection of additional initiator at second, third, fourth, and subsequent locations, is not accompanied by injection of any additional ethylene or comonomer.

The reaction can also be carried out in the presence of conventional modifiers, such as chain transfer agents. Typical chain transfer agents include non-copolymerizable chain transfer agents, such as: saturated aliphatic aldehydes, such as formaldehyde, acetaldehyde, or propionaldehyde; saturated aliphatic ketones, such as acetone, diethyl ketone and diamyl ketone; saturated aliphatic alcohols, such as methanol, ethanol and propanol; paraffins and cycloparaffins such as pentane, hexane and cyclohexane; aromatic compounds, such as toluene, diethylbenzene and xylene; and other compounds which act as chain terminating agents such as propylene, carbon tetrachloride and chloroform. Preferred chain transfer agents are non-copolymerizable, with acetaldehyde being particularly preferred.

Alternatively, copolymerizable chain transfer agents, including propylene, isobutylene, 1-butene, etc., can be used either alone as a class or in combination with non-copolymerizable chain transfer agents. Polymers made using copolymerizable chain transfer agents will usually have peak melting temperatures less than the maximum attainable for the copolymer composition and reactor conditions used.

The tubular ethylene alkyl acrylate and alkyl methacrylate copolymers of the invention are characterized by the following properties:

(a) Total comonomer content: from 5 mol % to 20 mol %. These mole percents represent the total moles of comonomer-derived units in the copolymer as a percentage of the total number of moles of monomer-derived and comonomer-derived units in the copolymer. Alternative lower limits of the comonomer-derived unit content can be at least 6%, at least 7%, or at least 8% (mole percents). It is a particular feature of the copolymers of the present invention that relatively large amounts of comonomer can be incorporated in the copolymer, while still maintaining the favorable properties described herein. In embodiments including ethylene, alkyl acrylate or alkyl methacrylate, and a comonomer having a reactivity ratio relative to ethylene of 2 or less (such as a vinyl ester), the copolymers of the present invention preferably include at least 2 mol % or at least 3 mol % or at least 4 mol % of the alkyl acrylate or alkyl methacrylate comonomer, and at least 0.5 mol % or at least 1 mol % or at least 1.5 mol % of the comonomer having a reactivity ratio $r_2$ relative to ethylene of 2 or less, with the total comonomer content being as described above.

(b) Melt index in g/10 min of 1 to 10,000. Alternative preferred lower limits of the melt index can be at least 100 g/10 min, at least 300 g/10 min, at least 600 g/10 min, at least 900 g/10 min, at least 1500 g/10 min, or at least 2000 g/10 min.

(c) Heat resistance: Percent melted at 60° C. The copolymers of the present invention and adhesive formulations using them show increased heat resistance relative to comparable conventional materials. For many applications, heat resistance at 60° C. is required, since the product incorporating the adhesive or a molded or extruded article made from the copolymer might be exposed to temperatures of up to about 60° C. during shipping, storage or in use. Thus, differential scanning calorimetry (DSC) can be used to measure the amount of the copolymer melted at 60° C. as an indicator of heat resistance. Using this measure, in some embodiments, the copolymers of the present invention show a percent melted at 60° C. of less than 40%, preferably less than 30%, and more preferably less than 25%. In embodiments including ethylene, alkyl acrylate or alkyl methacrylate, and a comonomer having a reactivity ratio $r_2$ relative to ethylene of 2 or less (such as a vinyl ester), the copolymers of the present invention show a percent melted at 60° C. of less than 70% or less than 60% or less than 50%.

(d) Heat resistance: Temperature at % melted. An alternative measure of heat resistance is the temperature required to melt a predetermined percentage of the copolymer, and this temperature can also be measured by DSC. The copolymers of the present invention show increased heat resistance over conventional comparable copolymers, as shown in the Examples herein; i.e., a higher temperature is required to melt a given percentage of the copolymer. Using these measures, in some embodiments the temperature required to melt 50% of a sample of the copolymers of the present invention can be at least 80° C., preferably at least 85° C., and more preferably at least 90° C.; the temperature required to melt 80% of a sample of the copolymers of the present invention can be at least 100° C., preferably at least 105° C.; and the temperature required to melt 100% of a sample of the copolymers of the present invention can be at least 110° C., preferably at least 115° C., more preferably at least 120° C. In embodiments including ethylene, alkyl acrylate or alkyl methacrylate, and a comonomer having a reactivity ratio $r_2$ relative to ethylene of 2 or less, the temperature required to melt 50% of a sample of the copolymers of the present invention can be at least 40° C. or at least 50° C. or at least 60° C.; the temperature required to melt 80% of a sample of the copolymers of the present invention can be at least 70° C. or at least 80° C. or at least 85° C.; and the temperature required to melt 100% of a sample of the copolymers of the present invention can be at least 80° C. or at least 90° C. or at least 100° C.

(d) Heat resistance: Temperature at % melted. An alternative measure of heat resistance is the temperature required to melt a predetermined percentage of the copolymer, and this temperature can also be measured by DSC. The copolymers of the present invention show increased heat resistance over conventional comparable copolymers, as shown in the Examples herein; i.e., a higher temperature is required to melt a given percentage of the copolymer. Using these measures, in some embodiments the temperature required to melt 50% of a sample of the copolymers of the present invention can be at least 80° C., preferably at least 85° C., and more preferably at least 90° C.; the temperature required to melt 80% of a sample of the copolymers of the present invention can be at least 100° C., preferably at least 105° C.; and the temperature required to melt 100% of a sample of the copolymers of the present invention can be at least 110° C., preferably at least 115° C., more preferably at least 120° C. In embodiments including ethylene, alkyl acrylate or alkyl methacrylate, and a comonomer having a reactivity ratio $r_2$ relative to ethylene of 2 or less, the temperature required to melt 50% of a sample of the copolymers of the present invention can be at least 40° C. or at least 50° C. or at least 60° C.; the temperature required to melt 80% of a sample of the copolymers of the present invention can be at least 70° C. or at least 80° C. or at least 85° C.; and the temperature required to melt 100% of a sample of the copolymers of the present invention can be at least 80° C. or at least 90° C. or at least 100° C.

(e) Vicat Softening Point: Another measure of the higher heat resistance of copolymers of the present invention is shown by the Vicat Softening Point as determined by the modified ASTM procedure described in the Examples section herein using a 200 g load instead of a 1000 g load. Using this measure, in some embodiments copolymers of the present invention can have a Vicat Softening Point of at least 45° C., preferably at least 50° C., more preferably at least 55° C., and still more preferably at least 60° C. In embodiments including ethylene, alkyl acrylate or alkyl methacrylate, and a comonomer having a reactivity ratio $r_2$ relative to ethylene of 2 or less, copolymers of the present invention can have a Vicat Softening Point of at least 30° C. or at least 35° C. or at least 40° C.

(f) Peak Melting Point (maximum peak melting temperature): Copolymers of the present invention show a higher peak melting point, determined by DSC, relative to conventional copolymers having the same overall composition. As used herein and in the appended claims, the terms "peak melting point", "Tm" and "maximum peak melting temperature" refer to the temperature of the peak having the highest melting temperature, such as, for example, the 111.5° C. peak of Example 2 below. It should be noted in this connection that the maximum peak melting temperature can be located on a peak that appears on the DSC trace to be a higher temperature shoulder on a larger peak, such as, for example, the maximum peak melting temperature of 99.86° C. for Example 8, shown in FIG. 6. In some embodiments copolymers of the present invention can have a peak melting point of at least 100° C., preferably at least 105° C., more preferably at least 110° C. In some embodiments, the copolymers of the present invention can have a peak melting point at least 25° C. greater, preferably at least 35° C. greater, and more preferably at least 50° C. greater than the peak melting temperature of a uniformly homogeneous copolymer of the same chemical composition, such as those produced in autoclave reactors. In embodiments including ethylene, alkyl acrylate or alkyl methacrylate, and a comonomer having a reactivity ratio $r_2$ relative to ethylene of 2 or less, copolymers of the present invention can have a peak melting point of at least 80° C. or at least 90° C. or at least 95° C.

(g) Other values: although specific values are given for the physical properties described above, it should be emphasized that copolymers of the present invention can have other values, such as, in particular, the values exemplified in the Examples herein.

(h) Combinations of properties: It should be understood that copolymers of the present invention, and adhesive compositions including these copolymers, can have different combinations of the above properties, depending upon the desired end use of the copolymer or adhesive. Such copolymers with combinations of properties, as exemplified by the Examples herein, are surprising and unexpected; i.e., it was not heretofore known or expected that polymers having these combinations of properties could be produced.

Because of the improved heat resistance and other advantageous and surprising properties, copolymers of the invention are suitable for use as hot melt adhesives, or in the production of molded or extruded articles with improved temperature resistance. Thus, articles fabricated using these copolymers should be less susceptible to damage when exposed to higher temperatures, and also less susceptible to high frequency fatigue, which generates heat in the article. In addition, copolymers of the invention may also be useful in hot melt adhesives for applications requiring substantial retention of performance and strength at elevated temperatures.

6. EXAMPLES

In characterizing and evaluating the performance characteristics of the polymers described below, the following test procedures were used.

Melt Index was determined according to ASTM D-1238, with the following exceptions and clarifications. For samples with MIs of less than about 100 g/10 min, condition 190/2.16 of the ASTM method is used. For samples with MIs greater than about 100 g/10 min, the reported MI is based on a mathematical equation used to correlate data from condition 125/0.325 to condition 190/2.16. For those samples, the time needed for the piston to travel 25.4 mm at a melt temperature of 125° C. and 0.325 kg load is determined and used in the equation below to calculate the logarithm of a melt flow rate at 190° C. and 2.16 kg; the antilog of this value is reported as the Melt Index:

$$\text{Log } MI = 1.8311 + 0.8237 \log(928.4/t),$$

where t is the piston travel time in seconds. Melt index is reported in units of g/10 min, or the numerically equivalent units of dg/min.

Melt Viscosity was determined using test method ASTM D3236 (spindle 27) with the following exception; the melt temperature was 190° C.

Density (g/cm$^3$) was determined using chips cut from plaques compression molded in accordance with ASTM D-1292 Procedure C, aged in accordance with ASTM D-618 Procedure A, and measured according to ASTM D-1505.

Comonomer contents were determined using either an FTIR procedure using calibration standards with assigned values measured by proton NMR, or by using proton NMR directly.

The concentration of n-butyl acrylate in ethylene n-butyl acrylate copolymers was determined from a proton NMR spectrum with the temperature probe set for 120° C. Prior to data collection, the sample was prepared by dissolving approximately 30 mg of the sample in about 3 mL of tetrachloroethane-d2 at 130° C. Moles of n-butyl acrylate were calculated by dividing the integrated area of the region between 3.5 and 4.5 ppm by a factor of two. Moles of ethylene were calculated by subtracting ten times the number of moles of n-butyl acrylate from the integrated area of the region between 0.5 and 3.0 ppm and dividing this result by four.

The ethyl acrylate concentration in ethylene ethyl acrylate copolymers was also determined from proton NMR spectra with the temperature probe set for 120° C. Moles of ethyl acrylate were calculated by dividing the integrated area of the region between 3.5 and 4.5 ppm by a factor of two. Moles of ethylene were calculated by subtracting six times the number of moles of ethyl acrylate from the integrated area of the region between 0.5 and 3.0 ppm and dividing this result by four.

Similar calculations well-known in the art were used for determining vinyl acetate concentrations.

Differential Scanning Calorimetry (DSC) thermograms used to measure several parameters, such as Peak Melting Temperatures, Peak Crystallization Temperatures, Percent Melted at 60° C., and Temperature at which 50%, 80% and 100% of the sample was melted, were determined by two methods. "Method 1" used test method ASTM D-3417, with the exception that 5 minute hold times were used at the maximum and minimum temperatures used in the test, instead of 10 minutes. "Method 2" used the 10 minute hold time prescribed by ASTM D-3417.

Vicat Softening Point was determined on specimens compression molded in accordance with ASTM D-1928 Procedure C, aged in accordance with ASTM D-618 Procedure A, and measured in accordance with ASTM D-1525, Rate B, with the exception that a non-standard 200 g load was used instead of the standard 1000 g load.

Examples 1–5

Ethylene n-butyl acrylate copolymers of the present invention were produced in a high pressure tubular reactor similar in design to the tubular reactor disclosed in U.S. Pat. No. 4,135,044, but without side-streams feeding the reactor. The monomers were of conventional, commercial purity and there were no efforts to increase purity or modify them in any way. The n-butyl acrylate monomer was not stripped of oxygen or storage stabilizer.

The polymerization was initiated using the following mixture of initiators at the indicated amounts by weight: t-amyl peroxy neodecanoate, 39.5%, t-amyl peroxy pivalate, 23.7%, and t-amyl peroxy-2-ethylhexanoate, 36.8%. These were dissolved in a hydrocarbon solvent at 34.3 wt % initiator mixture to 65.7 wt % solvent.

Reactor throughput was held constant at 18.5 metric tons/hour. Reactor conditions and production results are shown in Table 1 below. Throughout the campaign, no significant reactor or preheater fouling was apparent. In Table 1, "LPS" and "HPS" indicate the low pressure separator and the high pressure separator, respectively. The tubular reactor was configured for either 3-point initiator injection or 4-point initiator injection. The dashed lines "--" in Table 1 indicate runs in which only 3-point initiation injection was used. The total initiator feed to the downstream injection points is given in Table 1 below. Initiator feed to each of the individual downstream injection points was apportioned between all of them to get the indicated peak temperatures.

Acetaldehyde was used as the chain transfer agent for all these samples. The acetaldehyde feed rate that had been calculated from plant experience with autoclave polymerized ethylene n-butyl acrylate was found to be well below the amount actually needed to get the desired melt index. More than double the calculated flow rate was actually needed for Examples 1–5.

The concentration of n-butyl acrylate in the Example copolymers was checked during the run for the purpose of process control by the plant Quality Control Laboratory using an FTIR method they had developed and use routinely for autoclave polymerized ethylene n-butyl acrylate copolymer made at the same plant. This method requires appropriate calibration standards to yield correct values. The comonomer contents of the Example copolymers were also subsequently determined by proton NMR as described above, and lower values were obtained. Proton NMR is an absolute analytical method that does not require any calibration standards to determine correct values. The difference in values determined by the two methods indicates that the more crystalline tubular reactor copolymers of the present invention have infrared absorbance characteristics which are different than the infrared absorbance characteristics of conventional autoclave-produced ethylene n-butyl acrylate copolymers.

TABLE 1

Reactor Conditions

| | Example | | | | |
|---|---|---|---|---|---|
| | 1 | 2 | 3 | 4 | 5 |
| Production Rate (kg/hr) | 5925 | 5925 | 5920 | 7720 | 7761 |
| Acetaldehyde Rate (kg/hr) | 61.4 | 61.4 | 59.1 | 82.7 | 52.7 |
| nBA Rate (kg/hr) | 1395 | 1664 | 1921 | 2232 | 2260 |
| Reactor Pressure (MPa) | 262 | 262 | 262 | 276 | 276 |
| 1st Inlet Temperature (° C.) | 143 | 143 | 143 | 143 | 143 |
| 2nd Inlet Temperature (° C.) | 157 | 157 | 157 | 160 | 157 |
| 3rd Inlet Temperature (° C.) | 168 | 168 | 169 | 157 | 157 |
| 4th Inlet Temperature (° C.) | 120 | 119 | 122 | 157 | 154 |
| 1st Peak Temperature (° C.) | 216 | 216 | 216 | 221 | 221 |
| 2nd Peak Temperature (° C.) | 224 | 224 | 224 | 216 | 216 |
| 3rd Peak Temperature (° C.) | 232 | 232 | 232 | 213 | 213 |
| 4th Peak Temperature (° C.) | — | — | — | 207 | 207 |
| Initiator Feed Rate: 1st Injection Point (kg/hr) | 6.5 | 6.5 | 6.5 | 7.9 | 8.4 |
| Initiator Feed Rate: Sum of All Downstream Injection Points (kg/hr) | 19.4 | 19.4 | 19.4 | 23.4 | 25.2 |
| LPS Polymer Temp. (° C.) | 117 | 118 | 121 | 113 | 127 |
| LPS Pressure (kPa) | 73.1 | 74.5 | 78.6 | 137.9 | 144.8 |
| HPS Temperature (° C.) | 161 | 160 | 161 | 176 | 176 |
| HPS Pressure (MPa) | 30.4 | 30.4 | 30.4 | 30.5 | 30.4 |
| Pack-out MI (dg/min) | — | — | — | — | 364 |
| Pack-out Viscosity (mPa · s) | 2575 | 2912 | 4475 | 11070 | — |
| nBA (wt %) by FTIR* | 27.36 | 31.18 | 35.11 | 35.75 | 36.47 |

*see Table 2 for correct values determined by proton NMR.

These Examples contain relatively high levels of n-butyl acrylate comonomer, from about 7 mol % to over 10 mol %. Melt index ranged from a low of about 364 g/10 min to over an estimated 2500; melt viscosity at 190° C. was used in place of melt index for the grades with greater than 330 MI. Melt viscosity ranged from as high as about 48,000 mPa·s to as low as about 2400 mPa·s.

The composition, melt viscosity (or melt index $I_{2.16}$) and density of the copolymers, labeled as Examples 1–5, are shown in Table 2.

TABLE 2

Physical Properties of Tubular EnBA Copolymers

| | Example No. | | | | |
|---|---|---|---|---|---|
| | 1 | 2 | 3 | 4 | 5 |
| Melt Viscosity (mPa · s at 190° C.) | 2435 | 2870 | 4275 | 11,470 | 48,000 |
| MI (g/10 min) | n/a* | n/a* | n/a* | n/a* | 364 |
| Density (g/cm³) | 0.938 | 0.938 | 0.938 | 0.941 | 0.941 |
| nBA (mol %)(a) | 6.90 | 8.10 | 9.32 | 9.33 | 9.42 |
| nBA (wt %)(b) | 25.30 | 28.71 | 31.97 | 31.98 | 32.22 |

*not applicable
(a)by NMR
(b)calculated from mol % by NMR

Properties of the copolymers were measured by Differential Scanning Calorimetry (DSC) using two methods ("Method 1" and "Method 2") described above. The properties using the two methods are shown in Tables 3 and 4, respectively.

TABLE 3

DSC Properties of Tubular EnBA Copolymers (Method 1)

| | Example No. | | | | |
|---|---|---|---|---|---|
| | 1 | 2 | 3 | 4 | 5 |
| DSC Peak Tm (° C.)(a) | 108.0 | 107.7 | 105.9 | 109.3 | 108.8 |
| | 112.0 | 111.4 | 110.5 | 113.3 | 113.3 |
| DSC Peak Tc (° C.) | 96.1 | 95.1 | 92.0 | 94.4 | 91.7 |
| Heat of Melting (J/g) | 86.8 | 72.8 | 60.5 | 72.7 | 75.2 |
| Heat of Fusion (J/g) | −65.3 | −60.5 | −85.4 | −60.7 | −78.5 |
| % Melted at 60° C. | 22.8 | 26.4 | 17.5 | 20.2 | 23.3 |
| T at 50% Melted (° C.) | 88.5 | 86.5 | 91.5 | 92.0 | 92.5 |
| T at 80% Melted (° C.) | 107.5 | 106.5 | 106.3 | 109.5 | 110.0 |
| T at 100% Melted (° C.) | 123 | 120 | 116 | 119 | 124 |
| Vicat SP (° C.) | 69.1 | 60.9 | 54.4 | 63.6 | 63.5 |

(a)two peaks observed

TABLE 4

DSC Properties of Tubular EnBA Copolymers (Method 2)

| | Example No. | | | | |
|---|---|---|---|---|---|
| | 1 | 2 | 3 | 4 | 5 |
| DSC Melting Peak(s) (° C.)(a) | 112.3 | 111.5 | 110.6 | 113.6 | 113.2 |
| | 108.2 | 107.4 | 106.0 | 109.4 | 109.3 |
| | 88.88 | 88.88 | 88.88 | 90.69 | 91.86 |
| DSC Crystallization Peak(s) (° C.) | 97.00 | 96.32 | 93.11 | 95.33 | 93.45 |
| Heat of Melting (J/g) | 85.9 | 73.3 | 65.7 | 65.2 | 64.4 |
| Heat of Fusion (J/g) | −103 | −93.1 | −82.6 | −84.4 | −85.2 |
| % Melted at 60° C. | 24.6 | 25.3 | 27.8 | 20.8 | 20.6 |
| T at 50% Melted (° C.) | 88.3 | 87.6 | 85.5 | 94.7 | 96.6 |
| T at 80% Melted (° C.) | 107.8 | 107.0 | 106.1 | 110.2 | 110.4 |
| T at 100% Melted (° C.) | 116.5 | 115.9 | 115.6 | 117.9 | 118.4 |

(a)3 peaks observed

Figure 5:
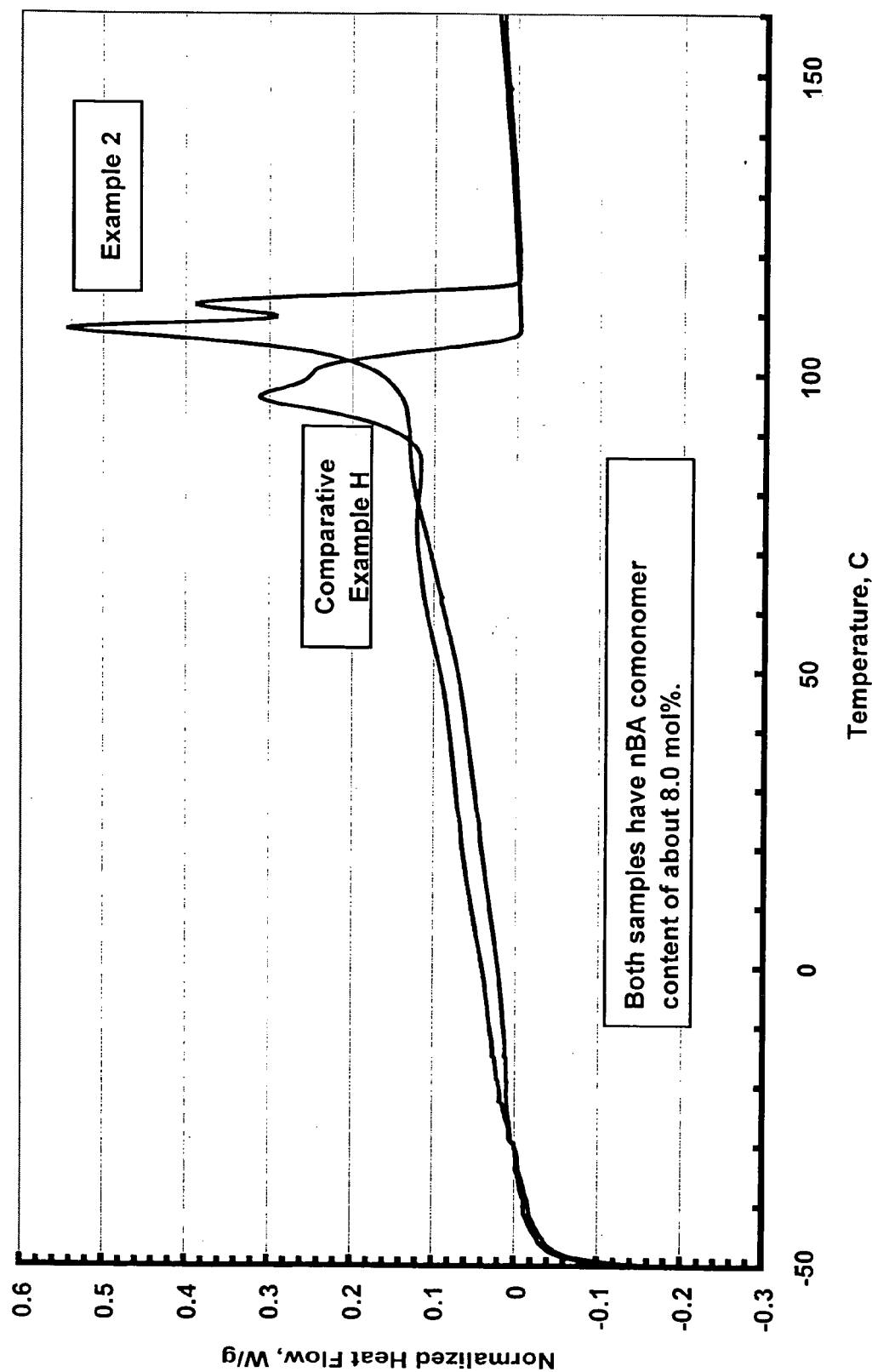
FIG. 5 shows the differential scanning calorimetry (DSC) thermograms for the copolymer of Example 2 compared to the peak melting temperature of a single-point tubular copolymer of approximately the same comonomer content (Comparative Example H), using DSC Method 2 as defined herein.

In Table 4, three peaks are reported for the DSC melting peak values. These "peaks" were assigned based on DSC curves as shown in FIG. 5. For example, referring to FIG. 5 and Table 4, the DSC trace for Example 2 shows a small peak at 89° C., and overlapping peaks at about 107° C. and 111° C. These are the three peaks reported in Table 4.

Comparative Examples A and B were made using a well back-mixed, high pressure autoclave to form ethylene n-butyl acrylate copolymers of the indicated melt viscosity and comonomer content. Comparative Examples A and B are most closely comparable to Examples 5 and 4 respectively. Comparative Examples C and D are experimental ethylene n-butyl acrylate copolymers produced by ExxonMobil Chemical in a well back-mixed, high pressure autoclave. Comparative Examples E, F and G are commercially available ethylene ethyl acrylate copolymers made by Union Carbide Corporation (a subsidiary of Dow Chemical Company) and denoted DPD-6169NT, DPD-6182 and DPD-9169 respectively. Comparative Example H is was made in a high pressure tubular reactor as described below in connection with Examples 6–11, except using only single-point injection. Composition, density, and melt viscosity properties of these comparative examples are shown in Table 5.

TABLE 5

Properties of Comparative Copolymers

| | Comparative Example No. | | | | | | | |
|---|---|---|---|---|---|---|---|---|
| | A | B | C | D | E | F | G | H |
| Melt Viscosity (mPa·s at 190° C.) | — | 8337* | — | — | — | — | — | 3720 |
| MI (g/10 min) | 330 | est 900 | 1.75 | 7.25 | 6.25 | 1.32 | 20.85 | |
| Density (g/cm³) | 0.922* | 0.919* | — | — | — | — | — | 0.9344 |
| Comonomer content (mol %)[a] | 9.53 | 9.53 | 9.63 | 7.30 | 5.53 | 4.43 | 5.83 | 5.83 |
| nBA (wt %)[b] | 32.5* | 32.5* | 32.75 | 26.46 | n/a | n/a | n/a | 27.97 |
| Ethylene acrylate (wt %)[c] | n/a | n/a | n/a | n/a | 17.3 | 14.2 | 18.1 | n/a |

—not measured or unavailable
*data from grade datasheets
n/a = not applicable
[a]Calculated from corresponding weight percent comonomer values.
[b]by FTIR
[c]by NMR Properties of the comparative examples were measured by Differential Scanning Calorimetry (DSC) using two methods ("Method 1" and "Method 2") described above. The properties using the two methods are shown in Tables 6 and 7, respectively.

TABLE 6

DSC Properties of Comparative Examples (Method 1)

| | Comparative Example No. | | | | | | | |
|---|---|---|---|---|---|---|---|---|
| | A | B | C | D | E | F | G | H |
| DSC Peak Tm (° C.)[a] | 58.7 | 58.0 | 67.6 | 78.4 | 97.4 | 99.5 | 96.9 | [c] |
| | 18 | 30 | | 65.2 | 84.8 | 87.7 | 83.2 | |
| DSC Peak Tc (° C.)[b] | 42.2 | 43.1 | 51.7 | 63.0 | 79.2 | 81.7 | 78.1 | [c] |
| | | | | 35.6 | 46.6 | 50.1 | 44.4 | |
| Heat of Melting (J/g) | 49.9 | 40.3 | 33.1 | 51.3 | 64.6 | 76.6 | 60.5 | [c] |
| Heat of Fusion (J/g) | −26.9 | −30.6 | −35.2 | −53.7 | −76.2 | −88.7 | −73.6 | [c] |
| % Melted at 60° C. | 87.3 | 85.3 | 68.3 | 46.3 | 22.3 | 20.3 | 22.2 | [c] |
| T at 50% Melted (° C.) | 23.8 | 35.6 | 50.0 | 61.5 | 83.2 | 85.9 | 90.2 | [c] |
| T at 80% Melted (° C.) | 53.6 | 56.7 | 64.9 | 76.1 | 97.1 | 99 | 97.3 | [c] |
| T at 100% Melted (° C.) | 82 | 84 | 76 | 86 | 107 | 108 | 107 | [c] |
| Vicat SP at 200 g (° C.) | 41* | 37* | 55.4 | 66.8 | 83.7 | 92.5 | 78.3 | 51.9 |

*data from grade datasheets
[a]two peaks observed except for sample C
[b]two peaks observed for samples D, E, F and G
[c]Not tested by DSC Method 1

TABLE 7

DSC Properties of Comparative Examples (Method 2)

| | Comparative Example No. | | | | | | | |
|---|---|---|---|---|---|---|---|---|
| | A | B | C | D | E | F | G | H |
| DSC Peak(s) Tm (° C.) | 60.94 | 58.05 | 65.61 | 76.95 | 97.89 | 99.93 | 97.41 | 100.1[a] |
| | 29.38 | 27.59 | | 61.20 | 83.70 | 87.60 | 82.70 | 96.04 |
| | | | | | | | | 74.80 |
| DSC Peak(s) Tc (° C.) | 46.33 | 45.73 | 50.58 | 62.41 | 80.1 | 82.46 | 79.27 | 81.78 |
| | 16.42 | 15.40 | 26.99 | 33.80 | 48.0 | 51.20 | 45.29 | 74.76 |
| | | | | | | | | 42.28 |
| Heat of Melting (J/g) | 44.9 | 37.5 | 55.4 | 73.2 | 81.6 | 94.1 | 79.2 | 69.4 |
| Heat of Fusion (J/g) | −44.6 | −47.1 | −51.6 | −69.3 | −99.7 | −110.8 | −95.0 | −84.4 |
| % Melted at 60° C. | 83.1 | 85.8 | 74.6 | 59.2 | 34.5 | 31.0 | 36.0 | 40.7 |
| T at 50% Melted (° C.) | 33.0 | 31.7 | 41.9 | 53.3 | 75.5 | 79.2 | 74.3 | 69.5 |
| T at 80% Melted (° C.) | 57.8 | 55.9 | 63.4 | 73.6 | 96.1 | 98.1 | 95.8 | 95.0 |
| T at 100% Melted (° C.) | 81.5 | 80.9 | 86.9 | 94.8 | 107.5 | 108.7 | 108.0 | 107.0 |

[a]Shoulder on high temperature side of primary melting peak.

Examples 6–11

The procedure above describes preparation of Examples 1–5. Similar procedures and conditions were used to prepare Comparative Example H and Examples 6–11. In Example 6, four-point injection was used. In Examples 7–11, three-point injection was used. In Comparative Example H, only a single-point initiator injection was used. In Examples 6–11, the monomer mixture included ethylene, n-butyl acrylate and vinyl acetate. Reactor throughput for these examples varied from 21.3 to 23.0 metric tons per hour. The process conditions are shown in Table 8.

TABLE 8

|  | Example No. | | | | | | |
| --- | --- | --- | --- | --- | --- | --- | --- |
|  | 6 | 7 | 8 | 9 | 10 | 11 | H |
| Production Rate (lb/hr) | 13000 | 12720 | 12590 | 12618 | 11546 | 11209 | 5220 |
| Acetaldehyde Rate (lb/hr) | 116 | 102 | 104 | 108 | 90 | 93 | 20* |
| nBA Rate (lb/hr) | 2379 | 2465 | 3010 | 3650 | 2025 | 2030 | 1595 |
| VA Rate (lb/hr) | 1957 | 1645 | 1140 | 840 | 1190 | 445 | 0 |
| Reactor Pressure (kpsig) | 36.0 | 36.0 | 36.0 | 36.0 | 36.0 | 36.0 | 36.0 |
| 1st Inlet Temperature (° F.) | 275 | 310 | 310 | 310 | 310 | 310 | 310 |
| 2nd Inlet Temperature (° F.) | 280 | 310 | 310 | 310 | 310 | 310 | 310 |
| 3rd Inlet Temperature (° F.) | 305 | 310 | 310 | 310 | 310 | 310 | 310 |
| 4th Inlet Temperature (° F.) | 325 | — | — | — | — | — | — |
| 1st Peak Temperature (° F.) | 435 | 430 | 430 | 430 | 430 | 430 | 430 |
| 2nd Peak Temperature (° F.) | 435 | 420 | 420 | 420 | 420 | 420 | 420 |
| 3rd Peak Temperature (° F.) | 410 | 420 | 420 | 420 | 420 | 420 | 420 |
| 4th Peak Temperature (° F.) | 395 | — | — | — | — | — | — |
| Initiator Consumption (gal/hr) | 20.5 | 19.4 | 18.0 | 20.8 | 16.0 | 16.5 | 11.5 |
| LPS Polymer Temp. (° F.) | 240 | 246 | 246 | 246 | 210 | 255 | 236 |
| LPS Pressure (psi) | 13 | 12.8 | 12.9 | 12.0 | 12.0 | 12.5 | 9.5 |
| HPS Polymer Temperature (° F.) | 305 | 316 | 314 | 314 | 311 | 311 | 289 |
| HPS Pressure (kpsig) | 3935 | 3990 | 3960 | 3960 | 3875 | 3850 | 4160 |
| Pack-out Viscosity (cp) | 2,805 | 2,520 | 2,785 | 2,535 | 2,820 | 2,685 | 3,720 |
| nBA (wt %) by NMR | 17.77 | 18.80 | 23.90 | 28.92 | 17.53 | 18.10 | 27.97 |
| VA (wt %) by NMR | 9.66 | 9.98 | 6.50 | 3.88 | 6.95 | 3.93 | 0 |

*estimated value

In Examples 6–11, copolymers of ethylene, n-butylacrylate and vinyl acetate were prepared using the method described above. Properties of these inventive copolymers are shown in Table 9. Note that all of the DSC measurements of the copolymers were made according to Method 2 as described above.

TABLE 9

| Properties of Tubular EnBAVA Copolymers | | | | | | |
| --- | --- | --- | --- | --- | --- | --- |
|  | Example No. | | | | | |
|  | 6 | 7 | 8 | 9 | 10 | 11 |
| Melt Viscosity (mPa · s at 190° C.) | 2805 | 2520 | 2785 | 2535 | 2820 | 2685 |
| Density (g/cm$^3$) | 0.9413 | 0.9415 | 0.9400 | 0.9400 | 0.9398 | 0.9392 |
| nBA (mol %)[a] | 4.92 | 5.23 | 6.74 | 8.57 | 4.90 | 4.76 |
| nBA (wt %)[b] | 17.83 | 18.8 | 23.74 | 29.24 | 18.04 | 18.1 |
| VA (mol %) | 4.10 | 4.13 | 2.75 | 1.63 | 3.25 | 1.54 |
| VA (wt %) | 9.99 | 9.98 | 6.52 | 3.73 | 8.04 | 3.93 |
| Total Comonomer Content (mol %) | 9.02 | 9.36 | 9.49 | 10.2 | 8.15 | 6.3 |
| DSC Melting Peak(s) (° C.) | 96.15[c] | 95.48[c] | 99.86[c] | 104.7 | 99.66[c] | 106.8 |
|  | 92.15 | 90.44 | 95.71 | 99.78 | 95.37 | 102.1 |
|  | 67.16 | 63.47 | 72.42 | 79.77 | 74.21 | 83.1 |
| DSC Crystallization Peak(s) (° C.) | 76.88 | 75.18 | 81.62 | 87.04 | 81.79 | 89.06 |
| Heat of Melting (J/g) | 72.8 | 71.3 | 66.0 | 54.5 | 81.6 | 93.7 |
| Heat of Fusion (J/g) | −91.9 | −83.1 | −80.9 | −74.5 | −93.8 | −109.6 |
| % Melted at 60° C. | 43.9 | 47.1 | 40.5 | 35.1 | 41.3 | 31.9 |
| T at 50% Melted (° C.) | 65.9 | 62.7 | 69.5 | 75.4 | 68.4 | 78.9 |
| T at 80% Melted (° C.) | 91.2 | 89.1 | 94.7 | 98.9 | 94.0 | 101.7 |
| T at 100% Melted (° C.) | 104.1 | 102.9 | 107.3 | 110.4 | 106.3 | 112.2 |
| Vicat SP at 200 g load (° C.) | 53.0 | 49.4 | 50.9 | 44.1 | 57.3 | 69.5 |

[a]Calculated from corresponding weight percent comonomer values.
[b]by $^1$H NMR
[c]Shoulder on high temperature side of primary melting peak.

The improvements in thermal properties of the copolymers of the present invention are demonstrated by: (1) increases in peak melting temperature; (2) various measures of how much polymer has melted at various points along the DSC trace; and (3) increases in Vicat Softening Point at 200 g load.

Figure 3:
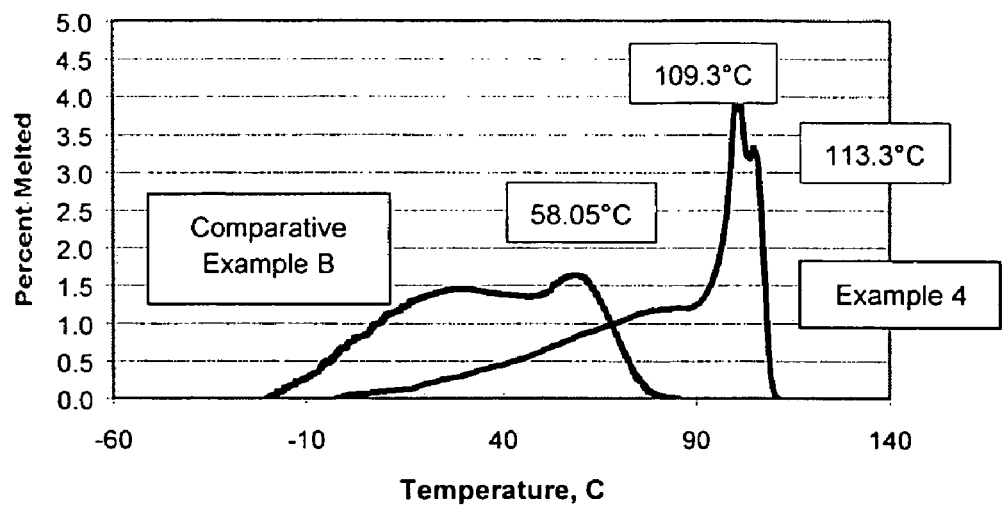
FIG. 3 shows the differential scanning calorimetry (DSC) thermograms for a copolymer of the present invention (Example 4) and a comparative non-inventive copolymer (Comparative Example B), using DSC Method 1 as defined herein.
Figure 4:
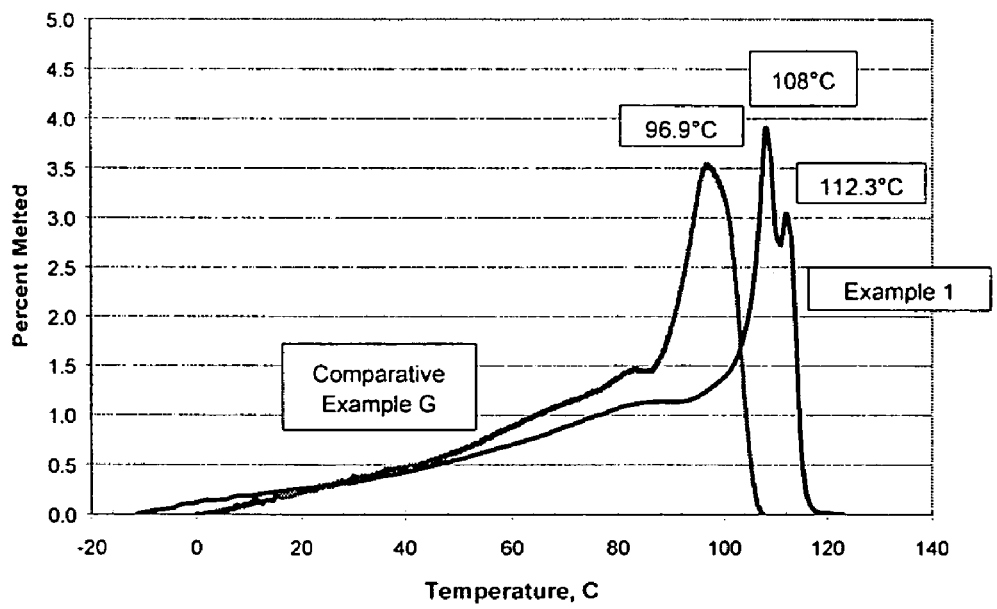
FIG. 4 shows the differential scanning calorimetry (DSC) thermograms for a copolymer of the present invention (Example 1) and a comparative non-inventive copolymer (Comparative Example G), using DSC Method 1 as defined herein.

The peak melting temperatures of the copolymers of the present invention, Examples 4 and 5, are 50° C. or more higher than the peak melting temperatures of the corresponding Comparative Examples A & B, as shown in FIG. 3. Furthermore, the improvement over conventional tubular reactor EEA copolymers can be seen in FIG. 4. FIG. 5 shows the higher peak melting temperature of the copolymer of Example 2 compared to the peak melting temperature of a single-point tubular copolymer of approximately the same comonomer content.

As discussed above, for many applications, heat resistance at 60° C. is required since the product might be exposed to temperatures as high as that during shipping, storage or in use. A lower percentage of the polymer melted at 60° C. indicates improved heat resistance. The results for Examples 1 through 5 indicate that less than about 25% of the polymer has melted when the samples have been heated to 60° C., whereas more than 85% of the Comparative Examples A & B and more than 45% of the Comparative Examples C & D have melted upon reaching that same temperature. Surprisingly, the inventive examples (Examples 1–5) show performance similar to Comparative Examples E, F and G in this comparison, even though the inventive examples contain at least 15% more to greater than double the concentration of comonomer on a molar basis; this is contrary to expectations, since higher comonomer content should lead to poorer performance in this measurement.

Similar improvement in heat resistance of the Examples can be seen in the significantly higher temperatures needed to melt 50, 80 and 100% of the inventive examples compared to the temperatures needed to melt comparable amounts of Comparative Examples A through D. The most significant differences in performance between the inventive examples and Comparative Examples E, F and G are the temperatures needed to melt 100% of the samples.

A third indication of the higher heat resistance of the products of the present invention is seen in the increases in Vicat Softening Point determined using a non-standard 200 g load instead of the 1000 g load specified in ASTM D-1525. (All of the inventive examples, and Comparative Examples A and B, were too soft to be tested using the standard 1000 g load). Examples 4 and 5 had results which were about 20° C. higher than the corresponding Comparative Examples A and B.

Figure 6:
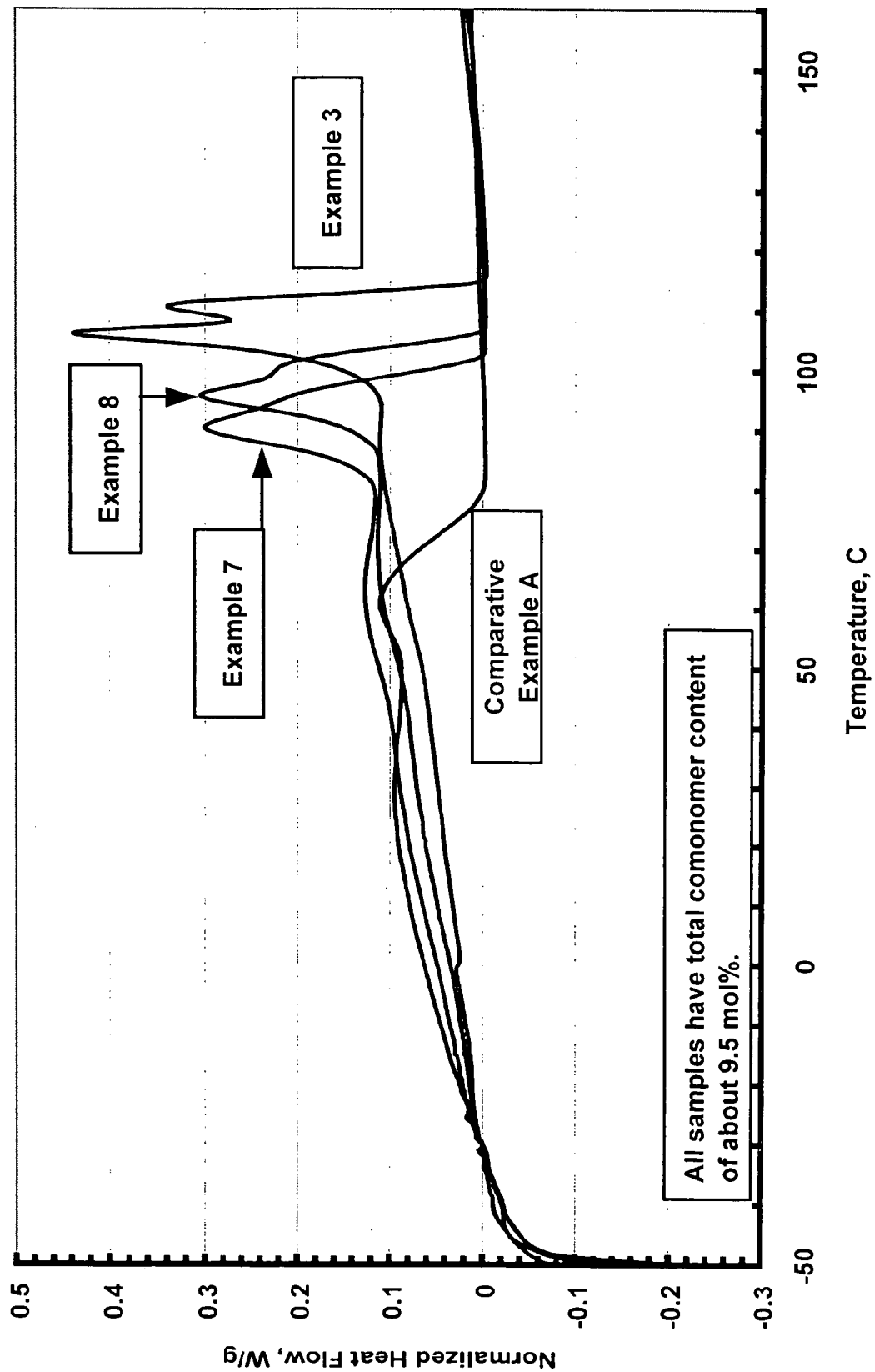
FIG. 6 shows the differential scanning calorimetry (DSC) thermograms for a copolymers of the invention (Examples 3, 7 and 8) and a conventional autoclave copolymer (Comparative Example A), using DSC Method 1 as defined herein.

Ethylene n-butyl acrylate vinyl acetate (EnBAVA) copolymers of the present invention (Examples 6 through 11) also have improved heat resistance over Comparative Examples A through D. This is shown by the increases in DSC Melting Peaks and the amount of material melted at various points on the DSC traces. FIG. 6 shows the increased peak melting temperatures for an EnBA copolymer of the invention (Example 3), EnBAVA copolymers of the invention (Examples 7 and 8) and a conventional autoclave copolymer (Comparative Example A). Increased Vicat Softening Points were also found comparing Examples 6 through 11 with Comparative Examples A and B, even though A and B are higher in viscosity than Examples 6 through 11; it is known in the art that Vicat Softening Points increase significantly with the viscosity of the polymer hence the improvement is even more dramatic. Comparative Examples C and D, which are very much higher in viscosity (well beyond the typical range of the instrument used to measure the viscosities of the Examples), had Vicat Softening Points that were in the range of Examples 1 through 11.

Various tradenames used herein are indicated by a ™ symbol, indicating that the names may be protected by certain trademark rights. Some such names may also be registered trademarks in various jurisdictions.

All patents, test procedures, and other documents cited herein, including priority documents, are fully incorporated by reference to the extent such disclosure is not inconsistent with this invention and for all jurisdictions in which such incorporation is permitted.

What is claimed is:

1. A copolymer consisting essentially of ethylene and at least 5 mol % of comonomer units derived from alkyl acrylates, alkyl methacrylates, or mixtures thereof, wherein the copolymer has:
   (i) a melt index of from 1 to 10,000 g/10 min;
   (ii) a maximum peak melting temperature of at least 100° C.; and
   (iii) a temperature required to melt 50% of the copolymer of at least 80° C.

2. The copolymer of claim 1, wherein the melt index is at least 100 g/10 min.

3. The copolymer of claim 1, wherein the melt index is at least 300 g/10 min.

4. Tbe copolymer of claim 1, wherein the melt index is at least 600 g/10 min.

5. The copolymer of claim 1, wherein the melt index is at least 900 g/10 min.

6. The copolymer of claim 1, wherein the melt index is at least 1500 g/10 min.

7. The copolymer of claim 1, wherein the melt index is at least 2000 g/10 min.

8. The copolymer of claim 1, wherein the copolymer contains at least 6 mol % of comonomer units derived from an alkyl acrylate or alkyl methacrylate.

9. The copolymer of claim 1, wherein the copolymer contains at least 7 mol % of comonomer units derived from an alkyl acrylate or alkyl methacrylate.

10. The copolymer of claim 1, wherein the copolymer contains at least 8 mol % of comonomer units derived from an alkyl acrylate or alkyl methacrylate.

11. The copolymer of claim 1, wherein the copolymer contains at least 9 mol % of comonomer units derived from an alkyl acrylate or alkyl methacrylate.

12. The copolymer of claim 1, wherein the copolymer has a maximum peak melting temperature of at least 105° C.

13. The copolymer of claim 1, wherein the copolymer has a maximum peak melting temperature of at least 110° C.

14. The copolymer of claim 1, wherein the temperature required to melt 50% of the copolymer is at least 85° C.

15. The copolymer of claim 1, wherein the temperature required to melt 50% of the copolymer is at least 90° C.

16. The copolymer of claim 1, wherein the copolymer has a temperature required to melt 80% of the copolymer of at least 100° C.

17. The copolymer of claim 16, wherein the temperature required to melt 80% of the copolymer is at least 105° C.

18. The copolymer of claim 1, wherein the copolymer has a temperature required to melt 100% of the copolymer of at least 110° C.

19. The copolymer of claim 18, wherein the temperature required to melt 100% of the copolymer is at least 115° C.

20. The copolymer of claim 18, wherein the temperature required to melt 100% of the copolymer is at least 120° C.

21. The copolymer of claim 1, wherein the alkyl group of the alkyl acrylate or alkyl methacrylate is a linear or branched $C_1$ to $C_{12}$ group.

22. The copolymer of claim 1, wherein the alkyl acrylate is selected from the group consisting of methyl acrylate, ethyl acrylate, n-butyl acrylate, iso-butyl acrylate, t-butyl acrylate, n-hexyl acrylate, 2-ethylbutyl acrylate, and 2-ethylhexyl acrylate.

23. The copolymer of claim 1, wherein the alkyl acrylate is n-butyl arcylate.

24. The copolymer of claim 1, further comprising polymerized comonomer units derived from acrylic acid, methacrylic acid, partial esters of maleic acid, carbon monoxide or mixtures thereof.

25. A copolymer of ethylene and at least 5 mol % comonomer, the comonomer consisting essentially of a first comonomer component consisting essentially of an alkyl acrylate, an alkyl methacrylate or a mixture thereof and a second comonomer component consisting essentially of a compound having a reactivity ratio $r_2$ of 2 or less relative to ethylene, wherein the copolymer has;
  (i) a melt index of from 1 to 10,000 g/10 min;
  (ii) a maximum peak melting temperature of at least 80° C.; and
  (iii) a temperature required to melt 50% of the copolymer of at least 40° C.

26. The copolymer of claim 25, wherein the melt index is at least 100 g/10 min.

27. The copolymer of claim 25, wherein the melt index is at least 300 g/10 min.

28. The copolymer of claim 25, wherein the melt index is at least 600 g/10 min.

29. The copolymer of claim 25, wherein the melt index is at least 900 g/10 min.

30. The copolymer of claim 25, wherein the melt index is at least 1500 g/10 min.

31. The copolymer of claim 25, wherein the melt index is at least 2000 g/10 min.

32. The copolymer of claim 25, wherein the copolymer contains at least 3 mol % of first comonomer units and at least 1 mol % of second comonomer units.

33. The copolymer of claim 25, wherein the copolymer contains at least 7 mol % of total comonomer units.

34. The copolymer of claim 25, wherein the copolymer has a maximum peak melting temperature of at least 90° C.

35. The copolymer of claim 25, wherein the copolymer has a maximum peak melting temperature of at least 95° C.

36. The copolymer of claim 25, wherein the temperature required to melt 50% of the copolymer is at least 50° C.

37. The copolymer of claim 25, wherein the temperature required to melt 50% of the copolymer is at least 60° C.

38. The copolymer of claim 25, wherein the copolymer has a temperature required to melt 80% of the copolymer of at least 70° C.

39. The copolymer of claim 38, wherein the temperature required to melt 80% of the copolymer is at least 80° C.

40. The copolymer of claim 38, wherein the temperature required to melt 80% of the copolymer is at least 85° C.

41. The copolymer of claim 25, wherein the copolymer has a temperature required to melt 100% of the copolymer of at least 80° C.

42. The copolymer of claim 41, wherein the temperature required to melt 100% of the copolymer is at least 90° C.

43. The copolymer of claim 41, wherein the temperature required to melt 100% of the copolymer is at least 100° C.

44. The copolymer of claim 25, wherein the alkyl group of the alkyl acrylate or alkyl methacrylate is a linear or branched $C_1$ to $C_{12}$ group.

45. The copolymer of claim 25, wherein the alkyl acrylate is selected from the group consisting of methyl acrylate, ethyl acrylate, n-butyl acrylate, iso-butyl acrylate, t-butyl acrylate, n-hexyl acrylate, 2-ethylbutyl acrylate, and 2-ethylhexyl acrylate.

46. The copolymer of claim 25, wherein the alkyl acrylate is n-butyl acrylate.

47. The copolymer of claim 25, wherein the reactivity ratio $r_2$ is 1.5 or less.

48. The copolymer of claim 25, wherein the reactivity ratio $r_2$ is 1.2 or less.

49. The copolymer of claim 25, wherein the second comonomer component comprises a vinyl ester.

50. The copolymer of claim 49, wherein the vinyl ester is vinyl acetate.

51. A process for producing a copolymer of ethylene and an alkyl acrylate or an alkyl methacrylate, the process comprising feeding a mixture of monomers comprising ethylene and at least one alkyl acrylate or alkyl methacrylate into a high pressure tubular reactor under polymerization conditions and in the presence
  of a free radical initiator to form an ethylene alkyl acrylate or alkyl methacrylate copolymer, wherein the free radical initiator is provided to the tubular reactor in at least two reaction zones along the length of the tubular reactor, and the mixture of monomers is provided to the tubular reactor only in a single reaction zone.

52. A process for producing a copolymer of ethylene and an alkyl acrylate or an alkyl methacrylate, the process comprising feeding a mixture of monomers comprising ethylene and at least one alkyl acrylate or alkyl methacrylate into a high pressure tubular reactor under polymerization conditions and in the presence of a free radical initiator to form an ethylene alkyl acrylate or alkyl methacrylate copolymer, wherein the free radical initiator is provided to the tubular reactor in at least three reaction zones along the length of the tubular reactor.

53. A copolymer produced by the process of claim 51.

54. A copolymer produced by the process of claim 52.

* * * * *